United States Patent
Rudolf et al.

(10) Patent No.: US 8,045,987 B2
(45) Date of Patent: Oct. 25, 2011

(54) RADIO NETWORK CONTROLLER PEER-TO-PEER EXCHANGE OF USER EQUIPMENT MEASUREMENT INFORMATION

(75) Inventors: Marian Rudolf, Montreal (CA); Shamim Akbar Rahman, Montreal (CA); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1032 days.

(21) Appl. No.: 10/606,716

(22) Filed: Jun. 26, 2003

(65) Prior Publication Data

US 2004/0121743 A1 Jun. 24, 2004

Related U.S. Application Data

(60) Provisional application No. 60/392,122, filed on Jun. 27, 2002.

(51) Int. Cl.
*H04W 36/00* (2009.01)
(52) U.S. Cl. .............. 455/436; 455/67.11; 455/442; 455/443; 455/444
(58) Field of Classification Search ........... 455/67.11, 455/436–444
See application file for complete search history.

(56) References Cited

U.S. PATENT DOCUMENTS

| | | | |
|---|---|---|---|
| 6,067,446 A | 5/2000 | Persson et al. | |
| 6,285,880 B1 * | 9/2001 | Gagnon et al. | 455/432.1 |
| 6,381,458 B1 * | 4/2002 | Frodigh et al. | 455/442 |
| 6,389,265 B1 | 5/2002 | Jeschke et al. | |
| 6,456,826 B1 | 9/2002 | Toskala et al. | |
| 6,618,589 B1 | 9/2003 | Rune et al. | |
| 6,643,318 B1 * | 11/2003 | Parsa et al. | 375/141 |
| 6,650,905 B1 | 11/2003 | Toskala et al. | |
| 7,623,447 B1 | 11/2009 | Faccin et al. | |
| 7,822,044 B2 | 10/2010 | Lee et al. | |
| 2001/0034254 A1 * | 10/2001 | Ranta | 455/574 |
| 2001/0036823 A1 | 11/2001 | Van Lieshout et al. | |
| 2002/0025820 A1 * | 2/2002 | Fauconnier et al. | 455/452 |
| 2002/0051431 A1 | 5/2002 | Choi et al. | |
| 2002/0094833 A1 * | 7/2002 | Lieshout et al. | 455/522 |
| 2002/0097740 A1 * | 7/2002 | Choi et al. | 370/441 |
| 2002/0173314 A1 * | 11/2002 | Hwang et al. | 455/453 |
| 2003/0016641 A1 * | 1/2003 | Terry et al. | 370/335 |
| 2003/0114181 A1 | 6/2003 | Lee et al. | |

(Continued)

FOREIGN PATENT DOCUMENTS

CN 1372779 10/2002

(Continued)

OTHER PUBLICATIONS

"Third Generation Partnership Project; Technical Specification Group Radio Access Network; UE Positioning in UTRAN Lub/Lur Protocol Aspects," 3GPP TR 25.850 V4.1.0, Jun. 2001, Release 4.

(Continued)

*Primary Examiner* — Zhiyu Lu
(74) *Attorney, Agent, or Firm* — Volpe and Koenig, P.C.

(57) ABSTRACT

A drifting wireless transmit/receive unit (WTRU) has an associated drift radio network controller (D-RNC) and an associated servicing radio network controller (S-RNC). The D-RNC sends a request message to the S-RNC requesting measurements of the drifting WTRU. The S-RNC receives the request message and sends an information message with the requested measurements to the D-RNC. The D-RNC receives the information message.

11 Claims, 3 Drawing Sheets

U.S. PATENT DOCUMENTS

Figure 1:
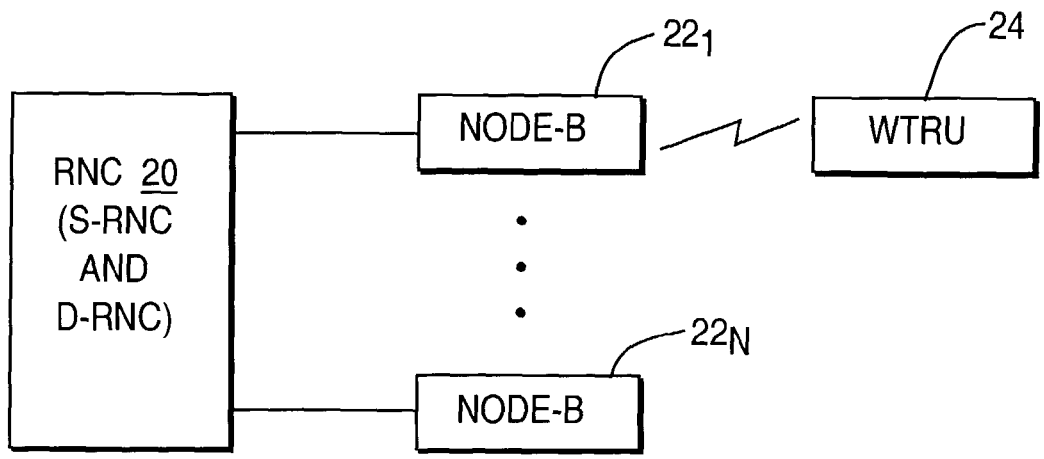

2009/0082007 A1 3/2009 DeBenedittis et al.

FOREIGN PATENT DOCUMENTS

| CN | 1372779 | A | 10/2002 |
|---|---|---|---|
| CN | 1372779 | A | 10/2002 |
| CN | 1395770 | | 2/2003 |
| CN | 1395770 | A | 2/2003 |
| CN | 1395770 | A | 2/2003 |
| RU | 2003113778 | | 12/2004 |
| RU | 2007134580 | | 3/2009 |
| WO | 97/007600 | | 2/1997 |
| WO | 97/07600 | | 2/1997 |
| WO | 01/31940 | | 5/2001 |
| WO | 02/43282 | | 5/2002 |
| WO | 02/43429 | | 5/2002 |
| WO | 02/056612 | | 7/2002 |
| WO | 02056612 | A2 | 7/2002 |
| WO | WO02056612 | A2 | 7/2002 |

OTHER PUBLICATIONS

"Third Generation Partnership Project; ETSI TS 125 433 v4.4.0 (Mar. 2003), Technical Specification, Universal Mobile Telecommunications System (UMTS); UTRAN Iub Interface NBAP Signalling" (3GPP TS 25.433 v4.4.0 Release 4).

$3^{rd}$ Generation Partnership Project; Technical Specification Group Radio Access Network; UTRAN $I_{ur}$ Interface General Aspects And Principles (Release 5), 3GPP TS 25.420 V5.1.0 (Sep. 2002).

$3^{rd}$ Generation Partnership Project; Technical Specification Group Radio Access Network; UTRAN $I_{ur}$ Interface General Aspects And Principles (Release 4), 3GPP TS 25.420 V4.0.0 (Mar. 2001).

Universal Mobile Telecommunications Systems (UMTS); UTRAN $I_{ur}$ Interface Radio Network Subsystem Application Part (RNSAP) Signalling (3GPP TS 25.423 version 5.6.0 Release 5) ETSI TS 125 423 V5.6.0 (Jun. 2003).

Universal Mobile Telecommunications Systems (UMTS); UTRAN $I_{ur}$ Interface RNSAP Signalling (3GPP TS 25.423 version 4.2.0 Release 4), ETSI TS 125 423 V4.2.0 (Sep. 2001).

3GPP, "$3^{rd}$ Generation Partnership Project; Technical Specification Group Radio Access Network; UTRAN $I_{ur}$ Interface General Aspects And Principles (Release 1999)," 3GPP TS 25.420 V3.5.0 (Mar. 2002).

3GPP, "$3^{rd}$ Generation Partnership Project; Technical Specification Group Radio Access Network; UTRAN $I_{ur}$ Interface General Aspects And Principles (Release 5)," 3GPP TS 25.420 V5.0.0 (Mar. 2002).

3GPP, "$3^{rd}$ Generation Partnership Project; Technical Specification Group Radio Access Network; UTRAN $I_{ur}$ Interface General Aspects And Principles (Release 4)," 3GPP TS 25.420 V4.2.0 (Mar. 2002).

3GPP, "Third Generation Partnership Project; Technical Specification Group Radio Access Network; UTRAN Iub Interface NBAP Signalling (Release 1999)," 3GPP TS 25.433 v3.9.0 (Mar. 2002).

3GPP, "Third Generation Partnership Project; Technical Specification Group Radio Access Network; UTRAN Iub Interface NBAP Signalling (Release 1999)," 3GPP TS 25.433 v3.13.0 (Mar. 2003).

3GPP, "Third Generation Partnership Project; Technical Specification Group Radio Access Network; UTRAN Iub Interface NBAP Signalling (Release 5)," 3GPP TS 25.433 v5.0.0 (Mar. 2002).

3GPP, "Third Generation Partnership Project; Technical Specification Group Radio Access Network; UTRAN Iub Interface NBAP Signalling (Release 5)," 3GPP TS 25.433 v5.5.0 (Jun. 2003).

3GPP, "$3^{rd}$ Generation Partnership Project; Technical Specification Group Radio Access Network; Radio Resource Control (RRC); Protocol Specification (Release 1999)," 3GPP TS 25.331 V3.11.0 (Jun. 2002).

3GPP, "$3^{rd}$ Generation Partnership Project; Technical Specification Group Radio Access Network; Radio Resource Control (RRC); Protocol Specification (Release 1999)," 3GPP TS 25.331 V3.15.0 (Jun. 2003).

3GPP, "$3^{rd}$ Generation Partnership Project; Technical Specification Group Radio Access Network; Radio Resource Control (RRC); Protocol Specification (Release 4)," 3GPP TS 25.331 V4.5.0 (Jun. 2002).

3GPP, "$3^{rd}$ Generation Partnership Project; Technical Specification Group Radio Access Network; Radio Resource Control (RRC); Protocol Specification (Release 4)," 3GPP TS 25.331 V4.10.0 (Jun. 2003).

3GPP, "$3^{rd}$ Generation Partnership Project; Technical Specification Group Radio Access Network; Radio Resource Control (RRC); Protocol Specification (Release 5)," 3GPP TS 25.331 V5.1.0 (Jun. 2002).

3GPP, "$3^{rd}$ Generation Partnership Project; Technical Specification Group Radio Access Network; Radio Resource Control (RRC); Protocol Specification (Release 5)," 3GPP TS 25.331 V5.5.0 (Jun. 2003).

3GPP, "$3^{rd}$ Generation Partnership Project; Technical Specification Group Radio Access Network; UTRAN Iur interface RNSAP signaling (Release 1999)," 3GPP TS 25.423 V3.9.0 (Mar. 2002).

3GPP, "$3^{rd}$ Generation Partnership Project; Technical Specification Group Radio Access Network; UTRAN Iur interface RNSAP signaling (Release 1999)," 3GPP TS 25.423 V3.13.0 (Mar. 2003).

3GPP, "$3^{rd}$ Generation Partnership Project; Technical Specification Group Radio Access Network; UTRAN Iur interface RNSAP signaling (Release 4)," 3GPP TS 25.423 V4.4.0 (Mar. 2002).

3GPP, "$3^{rd}$ Generation Partnership Project; Technical Specification Group Radio Access Network; UTRAN Iur interface RNSAP signaling (Release 4)," 3GPP TS 25.423 V4.9.0 (Jun. 2003).

3GPP, "$3^{rd}$ Generation Partnership Project; Technical Specification Group Radio Access Network; UTRAN Iur interface RNSAP signaling (Release 5)," 3GPP TS 25.423 V5.0.0 (Mar. 2002).

3GPP, "$3^{rd}$ Generation Partnership Project; Technical Specification Group Radio Access Network; UTRAN Iur interface RNSAP signaling (Release 5)," 3GPP TS 25.423 V5.6.0 (Jun. 2003).

3GPP, "3rd Generation Partnership Project; Technical Specification Group Radio Access Network; UE Positioning in UTRAN Lub/Lur Protocol Aspects (Release 4)," 3GPP TR 25.850 V4.3.0 (Dec. 2001).

"Third Generation Partnership Project; Technical Specification Group Radio Access Network; UE Positioning in UTRAN Lub/Lur Protocol Aspects," 3GPP TR 25.850 V4.1.0, Jun. 2001, Release 4.

$3^{rd}$ Generation Partnership Project; Technical Specification Group Radio Access Network; UTRAN $I_{ur}$ Interface General Aspects And Principles (Release 5), 3GPP TS 25.420 V5.1.0 (Sep. 2002).

$3^{rd}$ Generation Partnership Project; Technical Specification Group Radio Access Network; UTRAN $I_{ur}$ Interface General Aspects And Principles (Release 4), 3GPP TS 25.420 V4.0.0 (Mar. 2001).

Universal Mobile Telecommunications Systems (UMTS); UTRAN $I_{ur}$ Interface Radio Network Subsystem Application Part (RNSAP) Signalling (3GPP TS 25.423 version 5.6.0 Release 5) ETSI TS 125 423 V5.6.0 (Jun. 2003).

Universal Mobile Telecommunications Systems (UMTS); UTRAN $I_{ur}$ Interface RNSAP Signalling (3GPP TS 25.423 version 4.2.0 Release 4), ETSI TS 125 423 V4.2.0 (Sep. 2001).

3GPP, "$3^{rd}$ Generation Partnership Project; Technical Specification Group Radio Access Network; UTRAN $I_{ur}$ Interface General Aspects And Principles (Release 1999)," 3GPP TS 25.420 V3.5.0 (Mar. 2002).

3GPP, "$3^{rd}$ Generation Partnership Project; Technical Specification Group Radio Access Network; UTRAN $I_{ur}$ Interface General Aspects And Principles (Release 5)," 3GPP TS 25.420 V5.0.0 (Mar. 2002).

3GPP, "$3^{rd}$ Generation Partnership Project; Technical Specification Group Radio Access Network; UTRAN $I_{ur}$ Interface General Aspects And Principles (Release 4)," 3GPP TS 25.420 V4.2.0 (Mar. 2002).

3GPP, "Third Generation Partnership Project; Technical Specification Group Radio Access Network; UTRAN Iub Interface NBAP Signalling (Release 1999)," 3GPP TS 25.433 v3.9.0 (Mar. 2002).

3GPP, "Third Generation Partnership Project; Technical Specification Group Radio Access Network; UTRAN Iub Interface NBAP Signalling (Release 1999)," 3GPP TS 25.433 v3.13.0 (Mar. 2003).

3GPP, "Third Generation Partnership Project; Technical Specification Group Radio Access Network; UTRAN Iub Interface NBAP Signalling (Release 5)," 3GPP TS 25.433 v5.0.0 (Mar. 2002).

3GPP, "Third Generation Partnership Project; Technical Specification Group Radio Access Network; UTRAN Iub Interface NBAP Signalling (Release 5)," 3GPP TS 25.433 v5.5.0 (Jun. 2003).

3GPP, "$3^{rd}$ Generation Partnership Project; Technical Specification Group Radio Access Network; Radio Resource Control (RRC); Protocol Specification (Release 1999)," 3GPP TS 25.331 V3.11.0 (Jun. 2002).

3GPP, "3rd Generation Partnership Project; Technical Specification Group Radio Access Network; Radio Resource Control (RRC); Protocol Specification (Release 1999)," 3GPP TS 25.331 V3.15.0 (Jun. 2003).
3GPP, "3rd Generation Partnership Project; Technical Specification Group Radio Access Network; Radio Resource Control (RRC); Protocol Specification (Release 4)," 3GPP TS 25.331 V4.5.0 (Jun. 2002).
3GPP, "3rd Generation Partnership Project; Technical Specification Group Radio Access Network; Radio Resource Control (RRC); Protocol Specification (Release 4)," 3GPP TS 25.331 V4.10.0 (Jun. 2003).
3GPP, "3rd Generation Partnership Project; Technical Specification Group Radio Access Network; Radio Resource Control (RRC); Protocol Specification (Release 5)," 3GPP TS 25.331 V5.1.0 (Jun. 2002).
3GPP, "3rd Generation Partnership Project; Technical Specification Group Radio Access Network; Radio Resource Control (RRC); Protocol Specification (Release 5)," 3GPP TS 25.331 V5.5.0 (Jun. 2003).
3GPP, "3rd Generation Partnership Project; Technical Specification Group Radio Access Network; UTRAN Iur interface RNSAP signaling (Release 1999)," 3GPP TS 25.423 V3.9.0 (Mar. 2002).
3GPP, "3rd Generation Partnership Project; Technical Specification Group Radio Access Network; UTRAN Iur interface RNSAP signaling (Release 1999)," 3GPP TS 25.423 V3.13.0 (Mar. 2003).
3GPP, "3rd Generation Partnership Project; Technical Specification Group Radio Access Network; UTRAN Iur interface RNSAP signaling (Release 4)," 3GPP TS 25.423 V4.4.0 (Mar. 2002).
3GPP, "3rd Generation Partnership Project; Technical Specification Group Radio Access Network; UTRAN Iur interface RNSAP signaling (Release 4)," 3GPP TS 25.423 V4.9.0 (Jun. 2003).
3GPP, "3rd Generation Partnership Project; Technical Specification Group Radio Access Network; UTRAN Iur interface RNSAP signaling (Release 5)," 3GPP TS 25.423 V5.0.0 (Mar. 2002).
3GPP, "3rd Generation Partnership Project; Technical Specification Group Radio Access Network; UTRAN Iur interface RNSAP signaling (Release 5)," 3GPP TS 25.423 V5.6.0 (Jun. 2003).
3GPP, "3rd Generation Partnership Project; Technical Specification Group Radio Access Network; UE Positioning in UTRAN Lub/Lur Protocol Aspects (Release 4)," 3GPP TR 25.850 V4.3.0 (Dec. 2001).
"Third Generation Partnership Project; ETSI TS 125 433 v4.4.0 (Mar. 2003), Technical Specification, Universal Mobile Telecommunications System (UMTS); UTRAN Iub Interface NBAP Signalling" (3GPP TS 25.433 v4.4.0 Release 4).
"Third Generation Partnership Project; Technical Specification Group Radio Access Network; UE Positioning in UTRAN Lub/Lur Protocol Aspects," 3GPP TR 25.850 V4.1.0, Jun. 2001, Release 4.
3GPP, "3rd Generation Partnership Project; Technical Specification Group Radio Access Network; UE Positioning in UTRAN Lub/Lur Protocol Aspects (Release 4)," 3GPP TR 25.850 V4.3.0 (Dec. 2001).
3GPP, "Third Generation Partnership Project; Technical Specification Group Radio Access Network; UTRAN Iub Interface NBAP Signalling (Release 1999)," 3GPP TS 25.433 v3.9.0 (Mar. 2002).
3GPP, "Third Generation Partnership Project; Technical Specification Group Radio Access Network; UTRAN Iub Interface NBAP Signalling (Release 1999)," 3GPP TS 25.433 v3.13.0 (Mar. 2003).
3GPP, "Third Generation Partnership Project; Technical Specification Group Radio Access Network; UTRAN Iub Interface NBAP Signalling (Release 5)," 3GPP TS 25.433 v5.0.0 (Mar. 2002).
3GPP, "Third Generation Partnership Project; Technical Specification Group Radio Access Network; UTRAN Iub Interface NBAP Signalling (Release 5)," 3GPP TS 25.433 v5.5.0 (Jun. 2003).
3GPP, "3rd Generation Partnership Project; Technical Specification Group Radio Access Network; UTRAN $I_{ur}$ Interface General Aspects And Principles (Release 1999)," 3GPP TS 25.420 V3.5.0 (Mar. 2002).
3GPP, "3rd Generation Partnership Project; Technical Specification Group Radio Access Network; UTRAN $I_{ur}$ Interface General Aspects And Principles (Release 5)," 3GPP TS 25.420 V5.0.0 (Mar. 2002).
3GPP, "3rd Generation Partnership Project; Technical Specification Group Radio Access Network; UTRAN $I_{ur}$ Interface General Aspects And Principles (Release 4)," 3GPP TS 25.420 V4.2.0 (Mar. 2002).

3GPP, "3rd Generation Partnership Project; Technical Specification Group Radio Access Network; Radio Resource Control (RRC); Protocol Specification (Release 1999)," 3GPP TS 25.331 V3.11.0 (Jun. 2002).
3GPP, "3rd Generation Partnership Project; Technical Specification Group Radio Access Network; Radio Resource Control (RRC); Protocol Specification (Release 1999)," 3GPP TS 25.331 V3.15.0 (Jun. 2003).
3GPP, "3rd Generation Partnership Project; Technical Specification Group Radio Access Network; Radio Resource Control (RRC); Protocol Specification (Release 4)," 3GPP TS 25.331 V4.5.0 (Jun. 2002).
3GPP, "3rd Generation Partnership Project; Technical Specification Group Radio Access Network; Radio Resource Control (RRC); Protocol Specification (Release 4)," 3GPP TS 25.331 V4.10.0 (Jun. 2003).
3GPP, "3rd Generation Partnership Project; Technical Specification Group Radio Access Network; Radio Resource Control (RRC); Protocol Specification (Release 5)," 3GPP TS 25.331 V5.1.0 (Jun. 2002).
3GPP, "3rd Generation Partnership Project; Technical Specification Group Radio Access Network; Radio Resource Control (RRC); Protocol Specification (Release 5)," 3GPP TS 25.331 V5.5.0 (Jun. 2003).
3GPP, "3rd Generation Partnership Project; Technical Specification Group Radio Access Network; UTRAN Iur interface RNSAP signaling (Release 1999)," 3GPP TS 25.423 V3.9.0 (Mar. 2002).
3GPP, "3rd Generation Partnership Project; Technical Specification Group Radio Access Network; UTRAN Iur interface RNSAP signaling (Release 1999)," 3GPP TS 25.423 V3.13.0 (Mar. 2003).
3GPP, "3rd Generation Partnership Project; Technical Specification Group Radio Access Network; UTRAN Iur interface RNSAP signaling (Release 4)," 3GPP TS 25.423 V4.4.0 (Mar. 2002).
3GPP, "3rd Generation Partnership Project; Technical Specification Group Radio Access Network; UTRAN Iur interface RNSAP signaling (Release 4)," 3GPP TS 25.423 V4.9.0 (Jun. 2003).
3GPP, "3rd Generation Partnership Project; Technical Specification Group Radio Access Network; UTRAN Iur interface RNSAP signaling (Release 5)," 3GPP TS 25.423 V5.0.0 (Mar. 2002).
3GPP, "3rd Generation Partnership Project; Technical Specification Group Radio Access Network; UTRAN Iur interface RNSAP signaling (Release 5)," 3GPP TS 25.423 V5.6.0 (Jun. 2003).
3rd Generation Partnership Project; Technical Specification Group Radio Access Network; UTRAN $I_{ur}$ General Aspects And Principles (Release 5), 3GPP TS 25.420 V5.1.0 (Sep. 2002).
3rd Generation Partnership Project; Technical Specification Group Radio Access Network; UTRAN $I_{ur}$ Interface General Aspects And Principles (Release 4), 3GPP TS 25.420 V4.0.0 (Mar. 2001).
NOKIA, "Discussion on centralized vs. integrated CRRM," TSG-RAN Working Group 3 Meeting #24 TSG R3#(01)2897 (Oct. 22-26, 2001).
Universal Mobile Telecommunications Systems (UMTS); UTRAN $I_{ur}$ Interface Radio Network Subsystem Application Part (RNSAP) Signalling (3GPP TS 25.423 version 5.6.0 Release 5) ETSI TS 125 423 V5.6.0 (Jun. 2003).
Universal Mobile Telecommunications Systems (UMTS); UTRAN $I_{ur}$ Interface RNSAP Signalling (3GPP TS 25.423 version 4.2.0 Release 4), ETSI TS 125 423 V4.2.0 (Sep. 2001).
"Third Generation Partnership Project; Technical Specification Group Radio Access Network; UE Positioning in UTRAN Lub/Lur Protocol Aspects," 3GPP TR 25.850 V4.1.0, Jun. 2001, Release 4.
3rd Generation Partnership Project; Technical Specification Group Radio Access Network; UTRAN $I_{ur}$ Interface General Aspects And Principles (Release 5), 3GPP TS 25.420 V5.1.0 (Sep. 2002).
3rd Generation Partnership Project; Technical Specification Group Radio Access Network; UTRAN $I_{ur}$ Interface General Aspects And Principles (Release 4), 3GPP TS 25.420 V4.0.0 (Mar. 2001).
Universal Mobile Telecommunications Systems (UMTS); UTRAN $I_{ur}$ Interface Radio Network Subsystem Application Part (RNSAP) Signalling (3GPP TS 25.423 version 5.6.0 Release 5) ETSI TS 125 423 V5.6.0 (Jun. 2003).
Universal Mobile Telecommunications Systems (UMTS); UTRAN $I_{ur}$ Interface RNSAP Signalling (3GPP TS 25.423 version 4.2.0 Release 4), ETSI TS 125 423 V4.2.0 (Sep. 2001).

3GPP, "3rd Generation Partnership Project; Technical Specification Group Radio Access Network; UTRAN I_ur Interface General Aspects And Principles (Release 1999)," 3GPP TS 25.420 V3.5.0 (Mar. 2002).

3GPP, "3rd Generation Partnership Project; Technical Specification Group Radio Access Network; UTRAN I_ur Interface General Aspects And Principles (Release 5)," 3GPP TS 25.420 V5.0.0 (Mar. 2002).

3GPP, "3rd Generation Partnership Project; Technical Specification Group Radio Access Network; UTRAN I_ur Interface General Aspects And Principles (Release 4)," 3GPP TS 25.420 V4.2.0 (Mar. 2002).

3GPP, "Third Generation Partnership Project; Technical Specification Group Radio Access Network; UTRAN Iub Interface NBAP Signalling (Release 1999)," 3GPP TS 25.433 v3.9.0 (Mar. 2002).

3GPP, "Third Generation Partnership Project; Technical Specification Group Radio Access Network; UTRAN Iub Interface NBAP Signalling (Release 1999)," 3GPP TS 25.433 v3.13.0 (Mar. 2003).

3GPP, "Third Generation Partnership Project; Technical Specification Group Radio Access Network; UTRAN Iub Interface NBAP Signalling (Release 5)," 3GPP TS 25.433 v5.0.0 (Mar. 2002).

3GPP, "Third Generation Partnership Project; Technical Specification Group Radio Access Network; UTRAN Iub Interface NBAP Signalling (Release 5)," 3GPP TS 25.433 v5.5.0 (Jun. 2003).

3GPP, "3rd Generation Partnership Project; Technical Specification Group Radio Access Network; Radio Resource Control (RRC); Protocol Specification (Release 1999)," 3GPP TS 25.331 V3.11.0 (Jun. 2002).

3GPP, "3rd Generation Partnership Project; Technical Specification Group Radio Access Network; Radio Resource Control (RRC); Protocol Specification (Release 1999)," 3GPP TS 25.331 V3.15.0 (Jun. 2003).

3GPP, "3rd Generation Partnership Project; Technical Specification Group Radio Access Network; Radio Resource Control (RRC); Protocol Specification (Release 4)," 3GPP TS 25.331 V4.5.0 (Jun. 2002).

3GPP, "3rd Generation Partnership Project; Technical Specification Group Radio Access Network; Radio Resource Control (RRC); Protocol Specification (Release 4)," 3GPP TS 25.331 V4.10.0 (Jun. 2003).

3GPP, "3rd Generation Partnership Project; Technical Specification Group Radio Access Network; Radio Resource Control (RRC); Protocol Specification (Release 5)," 3GPP TS 25.331 V5.1.0 (Jun. 2002).

3GPP, "3rd Generation Partnership Project; Technical Specification Group Radio Access Network; Radio Resource Control (RRC); Protocol Specification (Release 5)," 3GPP TS 25.331 V5.5.0 (Jun. 2003).

3GPP, "3rd Generation Partnership Project; Technical Specification Group Radio Access Network; UTRAN Iur interface RNSAP signaling (Release 1999)," 3GPP TS 25.423 V3.9.0 (Mar. 2002).

3GPP, "3rd Generation Partnership Project; Technical Specification Group Radio Access Network; UTRAN Iur interface RNSAP signaling (Release 1999)," 3GPP TS 25.423 V3.13.0 (Mar. 2003).

3GPP, "3rd Generation Partnership Project; Technical Specification Group Radio Access Network; UTRAN Iur interface RNSAP signaling (Release 4)," 3GPP TS 25.423 V4.4.0 (Mar. 2002).

3GPP, "3rd Generation Partnership Project; Technical Specification Group Radio Access Network; UTRAN Iur interface RNSAP signaling (Release 4)," 3GPP TS 25.423 V4.9.0 (Jun. 2003).

3GPP, "3rd Generation Partnership Project; Technical Specification Group Radio Access Network; UTRAN Iur interface RNSAP signaling (Release 5)," 3GPP TS 25.423 V5.0.0 (Mar. 2002).

3GPP, "3rd Generation Partnership Project; Technical Specification Group Radio Access Network; UTRAN Iur interface RNSAP signaling (Release 5)," 3GPP TS 25.423 V5.6.0 (Jun. 2003).

3GPP, "3rd Generation Partnership Project; Technical Specification Group Radio Access Network; UE Positioning in UTRAN Lub/Lur Protocol Aspects (Release 4)," 3GPP TR 25.850 V4.3.0 (Dec. 2001).

"Third Generation Partnership Project; Technical Specification Group Radio Access Network; UE Positioning in UTRAN Lub/Lur Protocol Aspects," 3GPP TR 25.850 V4.1.0, Jun. 2001, Release 4.

3GPP, "Third Generation Partnership Project; Technical Specification Group Radio Access Network; UTRAN Iub Interface NBAP Signalling (Release 1999)," 3GPP TS 25.433 v3.9.0 (Mar. 2002).

3GPP, "Third Generation Partnership Project; Technical Specification Group Radio Access Network; UTRAN Iub Interface NBAP Signalling (Release 5)," 3GPP TS 25.433 v5.0.0 (Mar. 2002).

3GPP, "Third Generation Partnership Project; Technical Specification Group Radio Access Network; UTRAN Iub Interface NBAP Signalling (Release 5)," 3GPP TS 25.433 v5.5.0 (Jun. 2003).

3GPP, "3rd Generation Partnership Project; Technical Specification Group Radio Access Network; UTRAN I_ur Interface General Aspects And Principles (Release 1999)," 3GPP TS 25.420 V3.5.0 (Mar. 2002).

3GPP, "3rd Generation Partnership Project; Technical Specification Group Radio Access Network; UTRAN I_ur Interface General Aspects And Principles (Release 5)," 3GPP TS 25.420 V5.0.0 (Mar. 2002).

3GPP, "3rd Generation Partnership Project; Technical Specification Group Radio Access Network; UTRAN I_ur Interface General Aspects And Principles (Release 4)," 3GPP TS 25.420 V4.2.0 (Mar. 2002).

3GPP, "3rd Generation Partnership Project; Technical Specification Group Radio Access Network; Radio Resource Control (RRC); Protocol Specification (Release 1999)," 3GPP TS 25.331 V3.11.0 (Jun. 2002).

3GPP, "3rd Generation Partnership Project; Technical Specification Group Radio Access Network; Radio Resource Control (RRC); Protocol Specification (Release 1999)," 3GPP TS 25.331 V3.15.0 (Jun. 2003).

3GPP, "3rd Generation Partnership Project; Technical Specification Group Radio Access Network; Radio Resource Control (RRC); Protocol Specification (Release 4)," 3GPP TS 25.331 V4.5.0 (Jun. 2002).

3GPP, "3rd Generation Partnership Project; Technical Specification Group Radio Access Network; Radio Resource Control (RRC); Protocol Specification (Release 4)," 3GPP TS 25.331 V4.10.0 (Jun. 2003).

3GPP, "3rd Generation Partnership Project; Technical Specification Group Radio Access Network; Radio Resource Control (RRC); Protocol Specification (Release 5)," 3GPP TS 25.331 V5.1.0 (Jun. 2002).

3GPP, "3rd Generation Partnership Project; Technical Specification Group Radio Access Network; Radio Resource Control (RRC); Protocol Specification (Release 5)," 3GPP TS 25.331 V5.5.0 (Jun. 2003).

3GPP, "3rd Generation Partnership Project; Technical Specification Group Radio Access Network; UTRAN Iur interface RNSAP signaling (Release 1999)," 3GPP TS 25.423 V3.9.0 (Mar. 2002).

3GPP, "3rd Generation Partnership Project; Technical Specification Group Radio Access Network; UTRAN Iur interface RNSAP signaling (Release 1999)," 3GPP TS 25.423 V3.13.0 (Mar. 2003).

3GPP, "3rd Generation Partnership Project; Technical Specification Group Radio Access Network; UTRAN Iur interface RNSAP signaling (Release 4)," 3GPP TS 25.423 V4.4.0 (Mar. 2002).

3GPP, "3rd Generation Partnership Project; Technical Specification Group Radio Access Network; UTRAN Iur interface RNSAP signaling (Release 4)," 3GPP TS 25.423 V4.9.0 (Jun. 2003).

3GPP, "3rd Generation Partnership Project; Technical Specification Group Radio Access Network; UTRAN Iur interface RNSAP signaling (Release 5)," 3GPP TS 25.423 V5.0.0 (Mar. 2002).

3GPP, "3rd Generation Partnership Project; Technical Specification Group Radio Access Network; UTRAN Iur interface RNSAP signaling (Release 5)," 3GPP TS 25.423 V5.6.0 (Jun. 2003).

3rd Generation Partnership Project; Technical Specification Group Radio Access Network; UTRAN I_ur Interface General Aspects And Principles (Release 5), 3GPP TS 25.420 V5.1.0 (Sep. 2002).

3rd Generation Partnership Project; Technical Specification Group Radio Access Network; UTRAN I_ur Interface General Aspects And Principles (Release 4), 3GPP TS 25.420 V4.0.0 (Mar. 2001).

Universal Mobile Telecommunications Systems (UMTS); UTRAN I_ur Interface Radio Network Subsystem Application Part (RNSAP) Signalling (3GPP TS 25.423 version 5.6.0 Release 5) ETSI TS 125 423 V5.6.0 (Jun. 2003).

Universal Mobile Telecommunications Systems (UMTS); UTRAN I_ur Interface RNSAP Signalling (3GPP TS 25.423 version 4.2.0 Release 4), ETSI TS 125 423 V4.2.0 (Sep. 2001).

"Third Generation Partnership Project; Technical Specification Group Radio Access Network; UE Positioning in UTRAN Lub/Lur Protocol Aspects," 3GPP TR 25.850 V4.1.0, Jun. 2001, Release 4.

"Third Generation Partnership Project; ETSI TS 125 433 v4.4.0 (Mar. 2003), Technical Specification, Universal Mobile Telecommunications System (UMTS); UTRAN Iub Interface NBAP Signalling" (3GPP TS 25.433 v4.4.0 Release 4).

3rd Generation Partnership Project; Technical Specification Group Radio Access Network; UTRAN $I_{ur}$ Interface General Aspects And Principles (Release 5), 3GPP TS 25.420 V5.1.0 (Sep. 2002).

3rd Generation Partnership Project; Technical Specification Group Radio Access Network; UTRAN $I_{ur}$ Interface General Aspects And Principles (Release 4), 3GPP TS 25.420 V4.0.0 (Mar. 2001).

Universal Mobile Telecommunications Systems (UMTS); UTRAN $I_{ur}$ Interface Radio Network Subsystem Application Part (RNSAP) Signalling (3GPP TS 25.423 version 5.6.0 Release 5) ETSI TS 125 423 V5.6.0 (Jun. 2003).

Universal Mobile Telecommunications Systems (UMTS); UTRAN $I_{ur}$ Interface RNSAP Signalling (3GPP TS 25.423 version 4.2.0 Release 4), ETSI TS 125 423 V4.2.0 (Sep. 2001).

3GPP, "Third Generation Partnership Project; Technical Specification Group Radio Access Network; UTRAN Iub Interface NBAP Signalling (Release 4)," 3GPP TS 25.433 v4.9.0 (Jun. 2003).

3GPP, "3rd Generation Partnership Project; Technical Specification Group Radio Access Network; UTRAN $I_{ur}$ Interface General Aspects And Principles (Release 1999), " 3GPP TS 25.420 V3.5.0 (Mar. 2002).

3GPP, "3rd Generation Partnership Project; Technical Specification Group Radio Access Network; UTRAN $I_{ur}$ Interface General Aspects And Principles (Release 5), " 3GPP TS 25.420 V5.0.0 (Mar. 2002).

3GPP, "3rd Generation Partnership Project; Technical Specification Group Radio Access Network; UTRAN $I_{ur}$ Interface General Aspects And Principles (Release 4), " 3GPP TS 25.420 V4.2.0 (Mar. 2002).

3GPP, "3rd Generation Partnership Project; Technical Specification Group Radio Access Network; UTRAN Iur interface RNSAP signalling (Release 4), " 3GPP TS 25.423 V4.4.0 (Mar. 2002).

3GPP, "3rd Generation Partnership Project; Technical Specification Group Radio Access Network; UTRAN Iur interface RNSAP signalling (Release 4), " 3GPP TS 25.423 V4.9.0 (Jun. 2003).

3GPP, "3rd Generation Partnership Project; Technical Specification Group Radio Access Network; UTRAN Iur interface RNSAP signalling (Release 5), " 3GPP TS 25.423 V5.0.0 (Mar. 2002).

3GPP, "3rd Generation Partnership Project; Technical Specification Group Radio Access Network; UTRAN Iur interface RNSAP signalling (Release 5), " 3GPP TS 25.423 V5.6.0 (Jun. 2003).

3GPP, "3rd Generation Partnership Project; Technical Specification Group RAN; UTRAN Functions, Examples on Signalling Procedures (Release 1999), " 3GPP TR 25.931 V3.6.0 (Mar. 2002).

3GPP, "3rd Generation Partnership Project; Technical Specification Group Ran; UTRAN Functions, Examples on Signalling Procedures (Release 1999), " 3GPP TR 25.931 V3.7.0 (Jun. 2002).

3GPP, "3rd Generation Partnership Project; Technical Specification Group Ran; UTRAN Functions, Examples on Signalling Procedures (Release 4), " 3GPP TR 25.931 V4.3.0 (Mar. 2002).

3GPP, "3rd Generation Partnership Project; Technical Specification Group RAN; UTRAN Functions, Examples on Signalling Procedures (Release 4), " 3GPP TR 25.931 V4.4.0 (Jun. 2002).

3rd Generation Partnership Project; Technical Specification Group Radio Access Network; UTRAN $I_{ur}$ Interface General Aspects And Principles (Release 5), 3GPP TS 25.420 V5.1.0 (Sep. 2002).

3rd Generation Partnership Project; Technical Specification Group Radio Access Network; UTRAN $I_{ur}$ Interface General Aspects And Principles (Release 4), 3GPP TS 25.420 V4.0.0 (Mar. 2001).

* cited by examiner

RADIO NETWORK CONTROLLER PEER-TO-PEER EXCHANGE OF USER EQUIPMENT MEASUREMENT INFORMATION

CROSS REFERENCE TO RELATED APPLICATION(S)

This application claims priority from U.S. provisional application No. 60/392,122, filed Jun. 27, 2002, which is incorporated by reference as if fully set forth.

FIELD OF INVENTION

This invention relates to wireless communication systems. In particular, the invention relates to the transfer of information between radio network controllers in such systems.

BACKGROUND

FIG. 1 is an illustration of a wireless communication system where all the users are handled by a radio network controller (RNC) 20. Each user, wireless transmit/receive unit (WTRU) 24, wirelessly communicates with a Node-B $22_1$. A group of Node-Bs $22_1$-$22_2$ are controlled by the radio network controller (RNC) 20.

Figure 2:
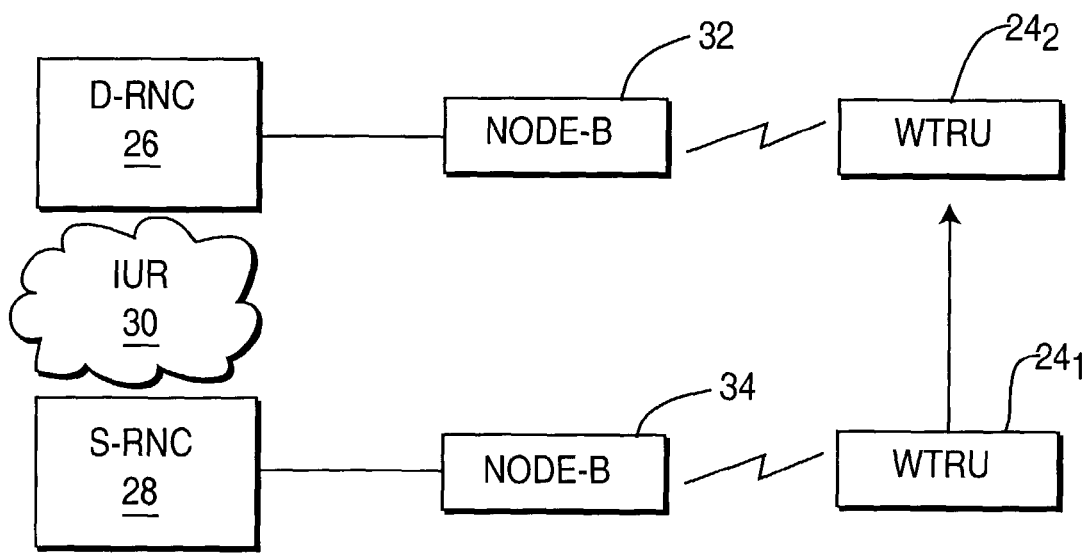

As the WTRU 24 moves, the WTRU $24_1$, $24_2$ is handed off between base stations/Node-Bs 32, 34. FIG. 2 is an illustration of a WTRU $24_1$, $24_2$ moving from an area handled by a first RNC 28 to an area handled by a second RNC 26. The WTRU $24_2$ is considered to have "drifted" into the new RNC's region and that RNC (the second RNC) is considered the drift RNC (D-RNC) 26. The D-RNC 26 has Node-Bs 32, which it controls. The first RNC is referred to as the servicing RNC (S-RNC) 28. Typically, the RNCs (S-RNC 28 and D-RNC 26) can communicate some information to each other over a RNC interface (Iur). After the WTRU $24_2$ "drifts" to the D-RNC 26, the D-RNC 26 performs functions, such as dynamic channel allocation (DCA), admission control, scheduling and RRM functions for the "drifting" WTRU $24_2$. The S-RNC 28 still performs other functions for the "drifting" WTRU $24_2$, such as handoff decisions and collecting of WTRU downlink measurements. When the WTRU 24 has not "drifted", such as in FIG. 1, the RNC 20 handling the WTRU 24 performs the functions of both the S-RNC 28 and D-RNC 26.

Under the R99, R4 and R5 Iur specifications as proposed for the third generation partnership project (3GPP), when the WTRU $24_1$, $24_2$ is handed over from the S-RNC 28 to the D-RNC 26, cell loading and many Node-B measurements are sent from the S-RNC 28 to the D-RNC 26. However, there is no mechanism to transfer certain information from the S-RNC 28 to the D-RNC 26, such as the WTRU measurements.

Accordingly, it is desirable to have better peer-to-peer communications between RNCs.

SUMMARY

A drifting wireless transmit/receive unit (WTRU) has an associated drift radio network controller (D-RNC) and an associated servicing radio network controller (S-RNC). The D-RNC sends a request message to the S-RNC requesting measurements of the drifting WTRU. The S-RNC receives the request message and sends an information message with the requested measurements to the D-RNC. The D-RNC receives the information message.

BRIEF DESCRIPTION OF THE DRAWING(S)

Figure 3:
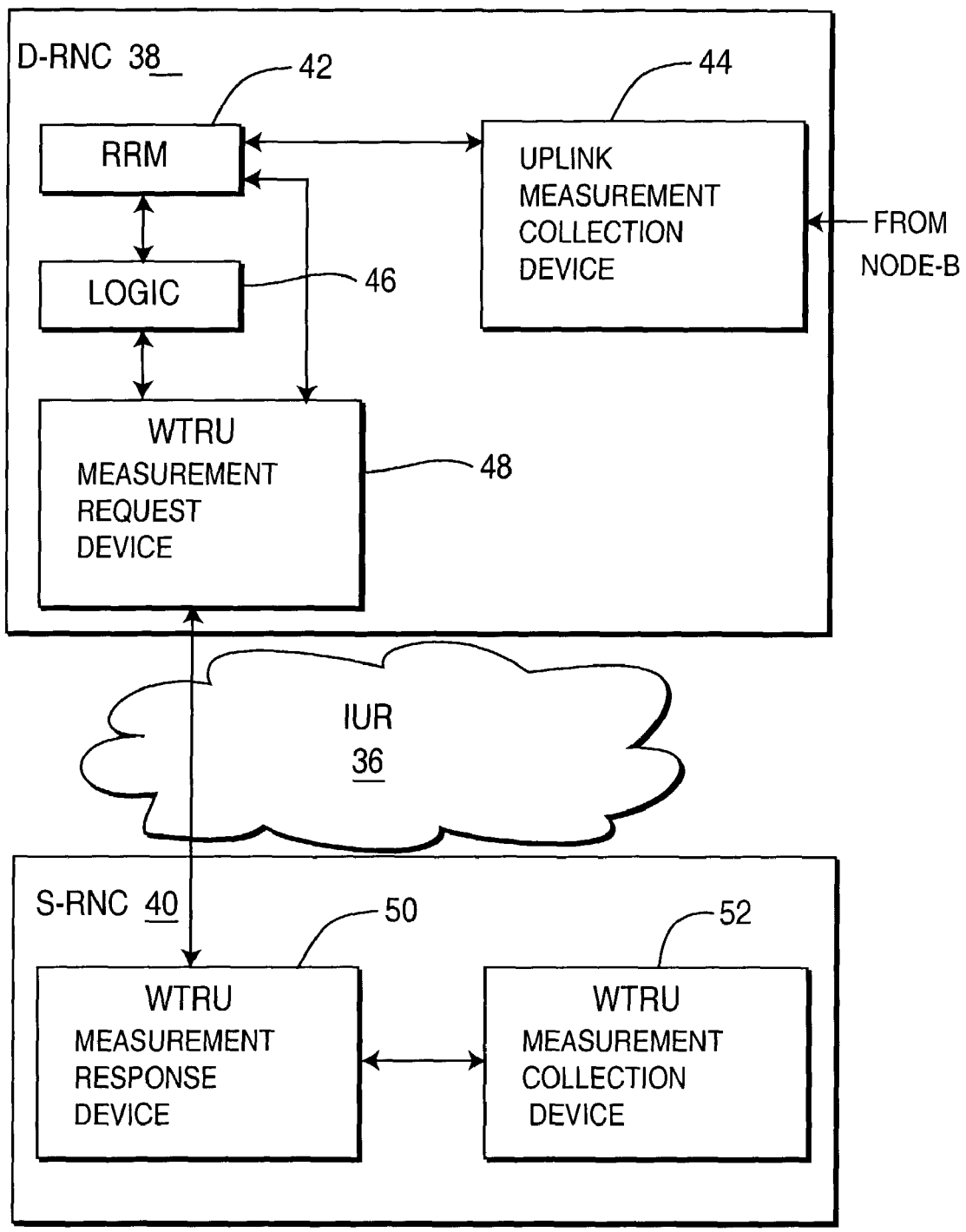
Figure 4:
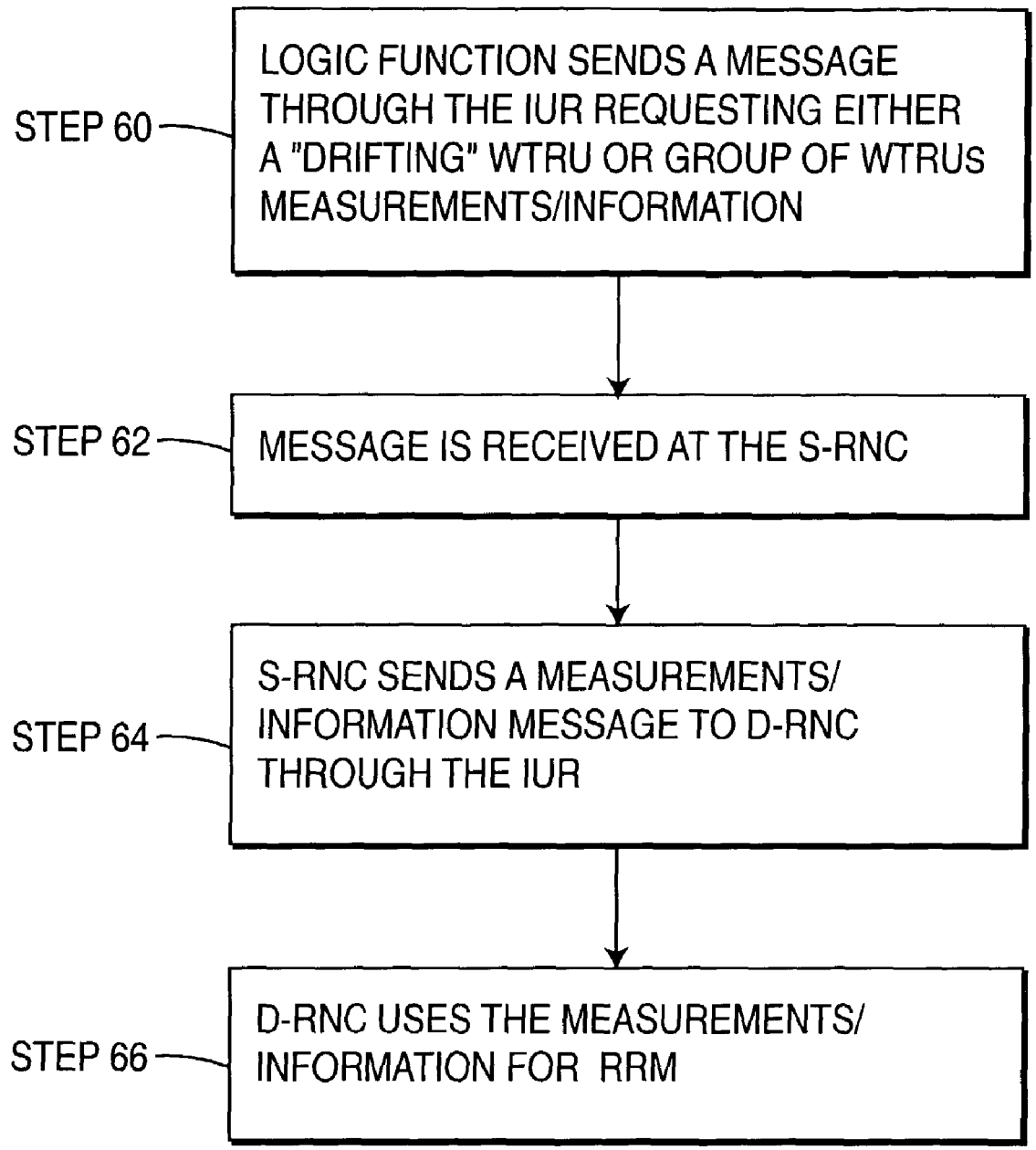

FIG. 1 is an illustration of a RNC handling a WTRU.
FIG. 2 is an illustration of a WTRU drifting between RNCs.
FIG. 3 is a block diagram of a preferred embodiment for peer-to-peer information exchange.
FIG. 4 is a flow chart of a preferred embodiment for peer-to-peer information exchange.

DETAILED DESCRIPTION OF THE PREFERRED EMBODIMENT(S)

Although the preferred embodiments are described in conjunction with a third generation partnership program (3GPP) wideband code division multiple access (W-CDMA) system, the embodiments are applicable to other wireless communication systems.

Hereafter, a wireless transmit/receive unit (WTRU) includes but is not limited to a user equipment, mobile station, fixed or mobile subscriber unit, pager, or any other type of device capable of operating in a wireless environment.

FIG. 3 is a simplified block diagram of a S-RNC 40, a D-RNC 38 and an IUR 36 for a "drifting" WTRU $24_2$ using peer-to-peer information exchange. FIG. 4 is a flow chart of peer-to-peer information exchange. The S-RNC 40 typically performs functions such as handoff decisions and collecting of WTRU downlink measurements for the "drifting" WTRU $24_2$. The D-RNC 38 typically performs functions such as DCA, admission control, scheduling and RRM functions for the "drifting" WTRU $24_2$.

The D-RNC 38 has a RRM 42. The RRM 42 controls the resources for the WTRUs of cells associated with the D-RNC 38. The D-RNC 38 collects uplink measurements for the cell of the "drifting" WTRU $24_2$ as well as other cells using an uplink measurement collection device 44. These measurements are available to the RRM 42 for use in resource allocation and management. The RRM 42 also has information for WTRUs that it is performing S-RNC functions.

The D-RNC 38 has logic associated with the RRM 42. When the RRM 42 requires downlink measurements of the "drifting" WTRU $24_2$ or a group or WTRUs, the logic 46 initiates a WTRU measurement request device 48 to send a message through the Iur 36 for such information, step 60.

Examples of the information that may be requested by the D-RNC 38, include downlink common control physical channel (CCPCH) received signal code power (RSCP), interference signal code power (ISCP) measurements and/or traffic volume measurements. Preferably, the D-RNC information request messages can not request the WTRU $24_2$ to make and send measurements, but the D-RNC 38 requests such measurement information currently available at the S-RNC 40.

The signaling messages on the Iur 36 allows any D-RNC 38 to initiate information exchange with S-RNCs on an individual WTRU, groups of WTRUs or WTRUs present in one or more cells for which it does not assume itself the role of an S-RNC. This procedure is preferably not a simple "forwarding" of WTRU-specific information, such as WTRU measurements. Preferably, the D-RNC logic 46 generally makes the decision of the type of information to request, although the logic function 46 may be performed by the controlling RNC (C-RNC). A logic function 46 in the D-RNC 38 decides if and when it will request measurements to be forwarded from the S-RNC 40. For example, if the D-RNC 38 detects that more than a threshold number or percentage, such as 10%, of its WTRUs are in "drift" mode, it would typically start requesting measurements to be forwarded. In the preferred implementation, existing information elements and standardized WTRU measurements/reporting mechanisms defined by the 3GPP standard for Node-B interface (Iub)/Iur are utilized.

One preferred message allows the D-RNC 38 to request measurements for a particular "drift" WTRU $24_2$ for a given time frame or for all the "drift" WTRUs in a given cell or group of cells associated with the S-RNC 40 for a given time frame. One scenario that requesting a group of WTRUs information is desirable is when many WTRUs having a particular S-RNC are in "drift" mode. For example, a first train station is supported by a first RNC and a second train station by a second RNC. All of the WTRUs boarding a train starting at the first station and departing at the second station may have the first RNC as the S-RNC 40 and the second RNC as the D-RNC 38. In this scenario, requesting WTRU information for the group of "drifting" WTRUs reduces the messaging overhead. However, a scenario where the procedure allows only a single WTRU per message may be used, with increased messaging overhead.

The message is received by the "drifting" WTRU's S-RNC 40, step 62. That S-RNC 40 has a WTRU measurement collection device 52. The WTRU measurement collection device 52 stores the particular WTRU's downlink measurements. A WTRU measurement response device 50 sends a measurement/information message to the D-RNC 38 through the Iur 36, step 64. The D-RNC RRM 42 uses these measurements in its resource allocations and management, step 66. One benefit of transferring such data through the IUR 36 is such data transfer is typically quite fast.

One preferred approach for requesting and transferring the WTRU measurements uses the radio network sublayer application part (RNSAP) procedures. RNSAP has four basic modules. One of these modules is the "Global Procedures" module. That module contains procedures that involve signaling for exchange of cell level information between RNCs. For example, received total wide band power, load and global positioning system (GPS) timing information is exchanged using the Common Measurement messages.

The list of information exchanged using RNSAP Global Procedures is expanded to allow for better RRM. In particular, this information aids primarily handover decisions. For example, information associated with cell biasing of handovers to neighboring RNCs would aid in such decisions. In the proposed 3GPP system, the information exchanged using the Global Procedures module is not related to a particular WTRU or group of WTRUs. As a result, it does not support the transfer of WTRU data transfer across the Iur 36. Preferably, information should transferred across the Iur 36 using RNSAP procedures, if the analogous cell information is available in the S-RNC 40 for relevant RRM decisions by the D-RNC 38.

Such information exchange over the Iur 36 allows a D-RNC 38 to request WTRU measurement information from the S-RNC 40 and allows more cell information to be exchanged between peer RNCs using the RNSAP Global Procedures module. Typically, this exchange of information enhances the performance of RRM algorithms (DCA, Admission Control, Scheduling and others) in the D-RNC 38, due to the availability of WTRU measurements. Enhanced RRM, especially DCA, facilitates performance, efficiency and robustness in wireless systems, such as the time division duplex (TDD) mode of 3GPP.

What is claimed is:

1. A wideband code division multiple access (W-CDMA) first radio network controller (RNC) comprising:
    a logic device configured to control a measurement request device such that the measurement request device requests common measurements using a global procedures module of a radio network sublayer application part (RNSAP) procedures over a radio network controller interface (IUR) for a second RNC, the common measurements including received total wideband power, load and global positioning system (GPS) timing information; and
    the logic device configured to control the measurement request device such that the measurement request device requests measurements from the second RNC using RNSAP procedures over the IUR, the measurements including received signal code power (RSCP) of a common control physical channel (CCPCH) and interference signal code power (ISCP), wherein the logic device is further configured to utilize the CCPCH RSCP and ISCP measurements to establish radio resources for a particular user.

2. The first RNC of claim 1 wherein the measurement request device is configured to receive responses to the requests for common measurements and measurements.

3. The first RNC of claim 1 comprising a measurement collection device for storing the received responses.

4. A wideband code division multiple access (W-CDMA) first radio network controller (RNC) comprising:
    a measurement response device configured such that the measurement response device in response to receiving requests for common measurements using a global procedures module of a radio network sublayer application part (RNSAP) procedures from a radio network controller interface (IUR), sending a response message using the global procedures module of the RNSAP procedures over the IUR, the common measurements including received total wideband power, load and global positioning system (GPS) timing information; and
    the measurement response device configured such that in response to receiving requests for measurements from a second radio network controller using RNSAP procedures via the IUR, the measurement response device sends the measurements to the DRNC using RNSAP procedures over the IUR, the measurements including received signal code power (RSCP) of a common control physical channel (CCPCH) and interference signal code power (ISCP), wherein the CCPCH RSCP and ISCP measurements are utilized to establish radio resources for a particular user.

5. The first RNC of claim 4 wherein the RSCP is the RSCP of a common control channel.

6. The first RNC of claim 4 wherein the measurement response device is configured to retrieve the user measurements from a measurement collection device.

7. A wideband code division multiple access (W-CDMA) radio network controller (RNC) configured to operate as a first radio network controller (RNC) and a second RNC, the RNC comprising:
    a logic device configured to control a measurement request device such that the measurement request device requests common measurements using a global procedures module of a radio network sublayer application part (RNSAP) procedures over a radio network controller interface (IUR) for another radio network controller (RNC), the common measurements including received total wideband power, load and global positioning system (GPS) timing information;
a measurement response device configured such that the measurement response device in response to receiving requests for the common measurements using the global procedures module of RNSAP procedures from the IUR, sends a response message using the global procedures module of the RNSAP procedures over the IUR;
the logic device further configured when the RNC operates as the second RNC to control the measurement request device such that the measurement request device requests measurements from another RNC using RNSAP procedures over the IUR, the measurements including received signal code power (RSCP) of a common control physical channel (CCPCH) and interference signal code power (ISCP), and wherein the logic device is configured to utilize the CCPCH RSCP and ISCP measurements to establish radio resources for a particular user; and
the measurement response device further configured such that when the RNC operates as the first RNC and in response to receiving requests for measurements including received signal code power (RSCP) of a code composite physical channel (CCPCH) and interference signal code power (ISCP) from another RNC using RNSAP procedures via the IUR, the measurement response device sends the measurements to the requesting RNC using RNSAP procedures over the IUR.

8. The RNC of claim 7 wherein the measurement request device is configured to receive responses to the requests for common measurements.

9. The RNC of claim 7 comprising a measurement collection device for storing the received responses.

10. A method for use in a wideband code division multiple access communication system having a first radio network controller RNC and a second RNC, the method comprising:
requesting by one of the first RNC or the second RNC common measurements using a global procedures module of a radio network sublayer application part (RNSAP) procedures over a radio network controller interface (IUR) for another of the first RNC or the second RNC, the common measurements including received total wideband power, load and global positioning system (GPS) timing information;
in response to receiving requests for the common measurements using the global procedures module of the RNSAP procedures from the IUR by the other of the first RNC or the second RNC, sending a response message using the global procedures module of the RNSAP procedures over the IUR;
the second RNC requesting measurements from the first RNC using the RNSAP procedures over the IUR, the measurements including received signal code power (RSCP) of a common control physical channel (CCPCH) and interference signal code power (ISCP); and
the first RNC in response to receiving the request for measurements, sending the measurements to the second RNC using RNSAP procedures over the IUR, wherein the CCPCH RSCP and ISCP measurements are utilized to establish radio resources for a particular user.

11. A wideband code division multiple access (W-CDMA) first radio network controller (RNC) comprising:
a logic device configured to control a measurement request device such that the measurement request device requests common measurements using a global procedures module of a radio network sublayer application part (RNSAP) procedures over a radio network controller interface (IUR) for a second radio network controller (RNC), the common measurements including received total wideband power, load and global positioning system (GPS) timing information; and
the logic device configured to control the measurement request device such that the measurement request device requests measurements from the second RNC using RNSAP procedures over the IUR, the user measurements including received signal code power (RSCP) of a common control physical channel (CCPCH) and interference signal code power (ISCP); and
a radio resource management device configured to use the RSCP of the CCPCH and ISCP measurements to control resources for a particular user.

* * * * *